United States Patent
Stigler

(10) Patent No.: US 7,533,852 B2
(45) Date of Patent: May 19, 2009

(54) RETAINING CLIP WITH OFFSET LATCHING FINGERS

(75) Inventor: Mario Stigler, Schöffengrund (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/814,478

(22) Filed: Mar. 31, 2004

(65) Prior Publication Data
US 2005/0001108 A1    Jan. 6, 2005

Related U.S. Application Data

(63) Continuation of application No. PCT/EP02/10008, filed on Sep. 6, 2002.

(30) Foreign Application Priority Data
Sep. 7, 2001    (DE)    ................... 101 44 153

(51) Int. Cl.
*F16L 3/08*    (2006.01)
(52) U.S. Cl. ................ 248/65; 24/555; 24/561; 248/68.1
(58) Field of Classification Search ........... 248/65, 248/68.1, 74.2, 49, 346.5, 230.7, 316.7, 231.21, 248/231.81; 24/555, 556, 561, 562, 564
See application file for complete search history.

(56) References Cited

U.S. PATENT DOCUMENTS

| | | | | |
|---|---|---|---|---|
| 4,114,241 | A | | 9/1978 | Bisping ................ 403/188 |
| 4,253,629 | A | * | 3/1981 | Wilmes ................ 248/68.1 |
| 5,029,782 | A | * | 7/1991 | Andre et al. ............ 248/68.1 |
| 5,807,018 | A | | 9/1998 | Peek et al. ............. 403/397 |
| 5,947,426 | A | * | 9/1999 | Kraus .................. 248/74.2 |
| 5,954,300 | A | * | 9/1999 | Sturies et al. ........... 248/68.1 |

(Continued)

FOREIGN PATENT DOCUMENTS

EP    569297 A1 * 11/1993

(Continued)

*Primary Examiner*—A. Joseph Wujciak, III
(74) *Attorney, Agent, or Firm*—Harness, Dickey & Pierce, P.L.C.

(57) ABSTRACT

The holding clip (1) according to the invention, for simultaneous fastening of a plurality of approximately parallel-running, elongate articles (2) to a structure, in particular for the fastening of lines, pipes or cables, having a base part (3), in which receivers (8) for the elongate articles (2) are formed, having at least one partition (4, 4') between two such receivers 8, which comprises a front side (12) and a rear side (11), wherein there are provided for securing the elongate articles (2) in the receivers (8) at least one first latching finger (5) at the front side (12) and at least one second latching finger (6) at the rear side (11) of the partition (4, 4'), is characterized in that the width BR of each latching finger is smaller than the width BZ of the partition (4, 4') and the first latching finger (5) is arranged offset relative to the second latching finger (6) in such a way that no overlapping occurs. The laterally offset latching fingers (5, 6) allow a particularly compact style of construction of the retaining clip (1), which makes it possible to mount a plurality of articles in the retaining clip (1) simultaneously without the retaining clip (1) being substantially spread, with the result that the fastening of a plurality of articles is enabled in a simple manner.

13 Claims, 1 Drawing Sheet

U.S. PATENT DOCUMENTS

| | | | |
|---|---|---|---|
| 6,216,987 B1 | 4/2001 | Fukuo | 248/74.2 |
| 6,450,459 B2 * | 9/2002 | Nakanishi | 248/68.1 |
| 6,565,049 B2 * | 5/2003 | Hahn | 248/74.2 |
| 6,708,931 B2 * | 3/2004 | Miura | 248/68.1 |
| 2001/0019091 A1 * | 9/2001 | Nakanishi | 248/68.1 |
| 2004/0065785 A1 * | 4/2004 | Miura et al. | 248/62 |
| 2004/0113027 A1 * | 6/2004 | Nakanishi | 248/68.1 |
| 2004/0144897 A1 * | 7/2004 | Maruyama | 248/68.1 |

FOREIGN PATENT DOCUMENTS

| | | | |
|---|---|---|---|
| EP | 0 683 343 | 11/1995 | 3/13 |
| FR | 2 609 507 | 7/1988 | 2/20 |
| JP | 09-317946 | 12/1997 | 3/12 |
| JP | 2002-235872 | 8/2002 | 3/22 |

* cited by examiner

RETAINING CLIP WITH OFFSET LATCHING FINGERS

CROSS-REFERENCE TO RELATED APPLICATIONS

The present application is a continuation of pending international patent application PCT/EP02/10008 filed on Sep. 6, 2002 which designates the United States and was published in German, and which claims priority of German patent application 101 44 153.3 filed Sep. 7, 2001.

FIELD OF THE INVENTION

The invention relates to a retaining clip for fastening a plurality of approximately parallel-running, elongate articles to a structure, in particular for fastening lines, pipes or cables, having a base part, in which receivers for the elongate articles are formed, having at least one partition between two such receivers, which comprises a front side and a rear side, wherein there are provided for securing the elongate articles in the receivers at least one first latching finger at the front side and at least one second latching finger at the rear side of the partition.

BACKGROUND OF THE INVENTION

The known retaining clips are used in particular to fasten brake lines and cables in motor vehicles in a simple and inexpensive manner. By means of blocking fingers an unintentional detachment of the articles as a result of shaking or vibrations is prevented. The blocking fingers allow only a movement of the article in the assembly direction, while blocking a movement in the opposite direction. They offer only a slight resistance when the article is introduced in the assembly direction, and represent a considerable obstacle when the article is to be removed counter to assembly direction. Because the technology has been known for years, such clips are comparatively inexpensive to manufacture.

Known retaining clips however have the following drawbacks:

On the one hand, opposing blocking fingers have to be arranged a specific minimum distance apart from one another in order to allow the article to be fixed to pass through with sufficient ease. In the case of multiple receivers, said minimum distances add up and result in the retaining clip taking up a relatively large amount of space.

On the other hand, the retaining clip widens when an article is to be introduced. As the article is introduced, the latching fingers are compressed, causing spreading of the retaining clip. This is very disadvantageous especially when a plurality of articles are to be introduced simultaneously, particularly in one working step, into the retaining clip because the extra space needed adds up. Because of the deformation of the retaining clip a simultaneous introduction of a plurality of articles is difficult or impossible. The spreading is particularly pronounced when the retaining clip is of a compact design.

With known retaining clip geometries the only choice available was between two disadvantageous variants. Either the retaining clip had large distances between the blocking fingers, in which case the spreading was admittedly slight but the retaining clip was very large. Or the retaining clip was provided with minimal distances between the blocking fingers, in which case the retaining clip admittedly took up little room but the spreading during introduction of the articles was so great that a simultaneous introduction of a plurality of articles was difficult or impossible.

The object of the present invention is therefore to provide a particularly compact retaining clip, which during the simultaneous insertion of a plurality of articles takes up only a small amount of extra space and/or presents only slight spreading.

SUMMARY OF THE INVENTION

Said object is achieved by a retaining clip according to the invention in accordance with the features of claim 1. Further developments, which may occur individually or in combination, are the subject matter of the sub-claims.

The retaining clip according to the invention for, in particular, simultaneous fastening of a plurality of approximately parallel-running, elongate articles to a structure, in particular for the fastening of lines, pipes or cables, having a base part, in which receivers for the elongate articles are formed, having at least one partition between two such receivers, which comprises a front side and a rear side, wherein there are provided for securing the elongate articles in the receivers at least one first latching finger at the front side and at least one second latching finger at the rear side of the partition, is characterised in that the width of each latching finger is smaller than the width of the partition and the first latching finger is arranged offset relative to the second latching finger in such a way that no overlapping arises.

The effect achieved by the laterally offset arrangement of the latching fingers is that the latching fingers have to spring back only at one side of the partition. By virtue of the offset arrangement of adjacent latching fingers the widening of the retaining clip during the simultaneous introduction of a plurality of articles is reduced. In particular, a portion of the spreading of the retaining clip is converted into a rotational motion of the individual partitions, which has an advantageous effect upon the extra spatial requirement of the retaining clip. The arrangement according to the invention of the latching fingers allows the arrangement of more latching fingers, which leads to greater security.

With the aid of the base part the retaining clip is fastened in a manner known per se to a structure, for example in the field of vehicle manufacture, to the body of a vehicle. The elongate articles are grasped by the receiver and secured against unintentional detachment with the aid of the latching fingers. With the aid of the partitions a plurality of articles may be held by the same retaining clip.

In an advantageous development of the retaining clip according to the invention, the first latching finger is arranged laterally offset relative to the second latching finger. By virtue of the lateral arrangement an advantageous rotational movement of the partition is effected during introduction of the articles. The distance between the two latching fingers is advantageously 5 to 20% of the width of the partition, preferably 10 to 15% of the width of the partition. The effect achieved by the distance between the two adjacent latching fingers is that two adjacent latching fingers have only a slight influence upon one another and so an unnecessary spreading of the retaining clip during the introduction of a plurality of articles into the respective receivers is avoided.

In a further advantageous development of the retaining clip according to the invention, the partition wall is elbowed between the offset latching fingers. By virtue of the elbow, an adequate amount of space is provided for yielding of a latching finger during introduction. The elbow, on the one hand, reduces the size of the retaining clip because the depth of the elbow may be utilised twice, by two latching fingers, and, on the other hand, reduces the spreading of the retaining clip during introduction because the latching fingers may disappear in the elbow during introduction of the articles.

In a special development of the invention, the partition has an opening, in particular a slot. By virtue of the opening, in particular the slot, adjacent latching fingers are substantially independent of one another. The effect thereby achieved is that the retaining clip acquires extra elasticity, which manifests itself in a lower resistance in the assembly direction when the articles are introduced. The ability of the latching fingers to secure the articles against unintentional detachment remains unaffected thereby.

In a preferred development of the invention, on both sides of the partition in each case two or more vertically offset latching fingers are disposed. By virtue of the arrangement of a plurality of vertically offset latching fingers, additional security against detachment of the articles from the receiver is achieved. Even if an individual latching finger is no longer capable of fulfilling its function, others are available to prevent detachment.

According to the invention, the ratio of the width of an individual latching finger to the width of the partition is advantageously between 1:4 and 1:2, in particular the ratio is approximately 2:5. Said ratio advantageously maximises the retaining ability of the latching fingers, with the proviso of minimal spreading of the retaining clip during the simultaneous introduction of a plurality of articles.

According to the invention, the retaining clip has outer walls, which for securing the elongate articles comprise at least one latching finger. The outer walls therefore perform a similar retaining function to the partitions.

The outer walls are advantageously provided with reinforcing structures. During introduction of the articles the reinforcing structures counteract a widening of the retaining clip in that they compel the latching fingers to deform elastically to a greater extent. Despite such a reduction of the spreading of the retaining clip, simultaneous introduction of a plurality of articles is made possible by virtue of the arrangement according to the invention of the retaining fingers.

The retaining clip according to the invention is advantageously made of elastic material, in particular of plastics material. With the aid of a plastic injection moulding technique retaining clips according to the invention are simple and inexpensive to manufacture.

Further details and advantageous developments, which may arise individually or in combination, are described with reference to the accompanying drawings. The drawings are intended, not to limit the invention, but merely to clarify it by means of an example.

DETAILED DESCRIPTION OF THE PREFERRED EMBODIMENT

Figure 1:
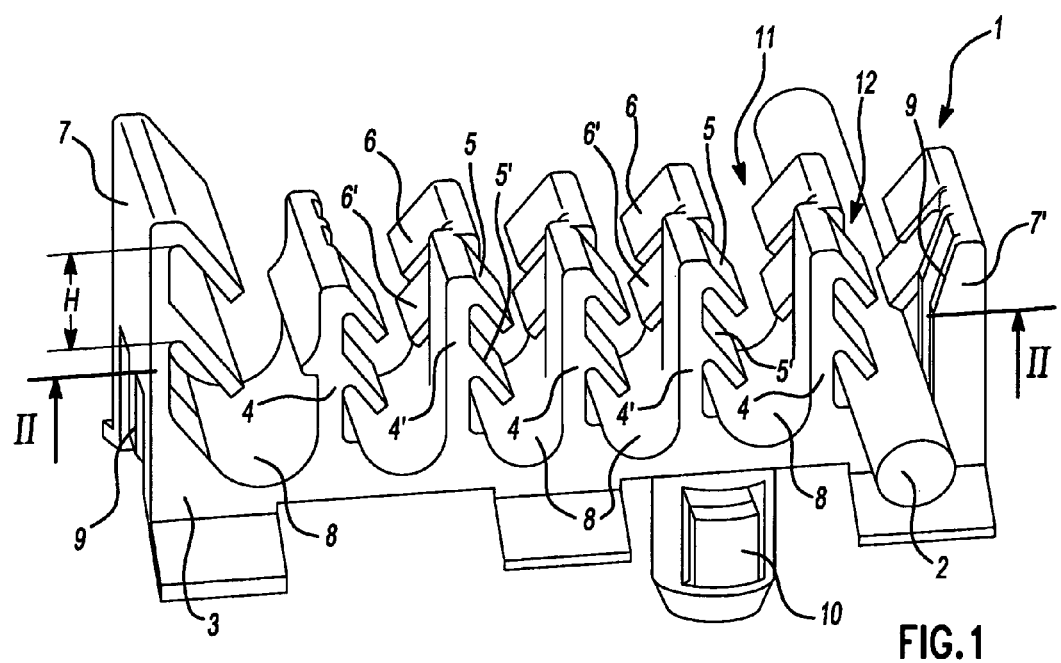
FIG. 1 is a perspective view of a retaining clip according to the invention.

FIG. 1 shows a retaining clip 1 according to the invention in a perspective view obliquely from above. The retaining clip 1 according to the invention comprises a base part 3, which may be fastened by a base part receiver 10 to a structure (not shown). Fastened to the base part 3 are outer walls 7, 7' and partitions 4, 4', which each form receivers 8 for articles 2 which are to be fastened. The partitions 4, 4' have latching fingers 5, 5', 6, 6', which point in the direction of the respective receivers 8. With the aid of the latching fingers 5, 5', 6, 6' an article 2 situated in the receiver 8 is secured against unintentional detachment.

The partitions 4, 4' each have a front side 12 and a rear side 11. On the front side 12 first latching fingers 5, 5' and on the rear side 11 second latching fingers 6, 6' are provided. Adjacent latching fingers 5 and 6 and/or 5' and 6' are arranged laterally offset so—viewed from the longitudinal direction of the retaining clip 1—there is no overlapping, which would take up space unnecessarily. The partitions 4, 4' on their respective sides have two vertically offset latching fingers 6, 6' and/or 5, 5' respectively, which provide additional security against unintentional detachment of the article.

The partitions 4, 4' are elbowed between the offset latching fingers 5, 6 and/or 5', 6'. The elbow on the one hand provides the latching fingers 5, 6 with enough space to yield when the articles are introduced and on the other hand reduces the required minimum size of the retaining clip 1.

The outer walls 7, 7' have reinforcing structures 9, which reduce an upward bending of the side walls 7, 7'. The vertical offset H between the latching fingers 5 and 5' and/or between 6 and 6' corresponds approximately to the diameter of the article, which is to be fastened and retained in the receiver 8. The retaining clip 1 is made of elastic and particularly robust plastics material.

Figure 2:
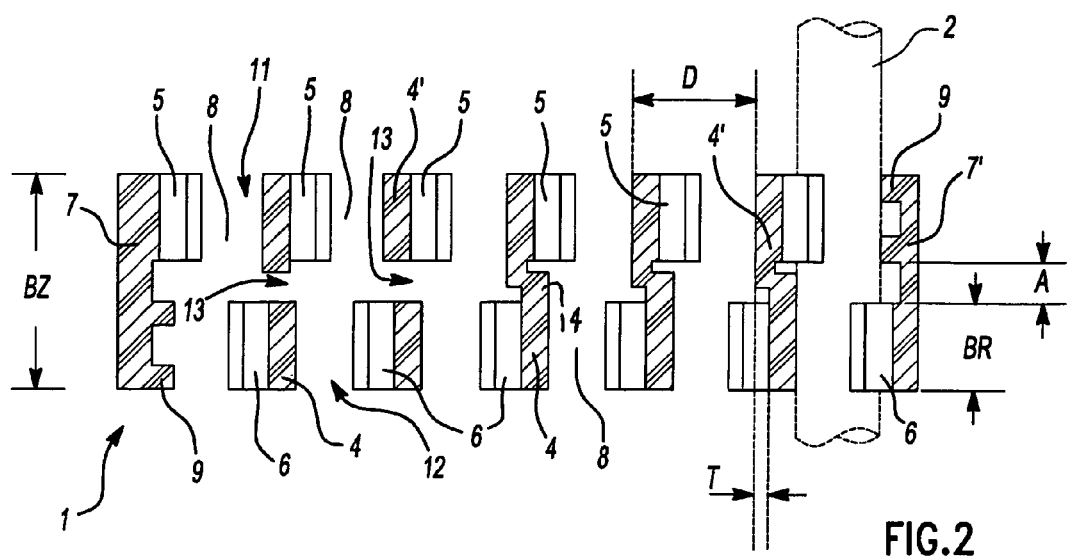
FIG. 2 is a sectional inverted-plan view of the retaining clip according to FIG. 1 along the line II-II.

FIG. 2 shows the retaining clip 1 according to FIG. 1 in a sectional inverted-plan view along the line II-II. The article 2 (shown by dots) is held in a receiver 8, which is formed by a partition 4' and an outer wall 7'. The partition 4', 4 has a front side 12 and a rear side 11. On the front side 12 first latching fingers 5 and on the rear side 11 second latching fingers 6 are fastened. With the aid of the latching fingers 5, 6 the article 2 is secured against unintentional detachment from the receiver 8.

The partitions 4, 4' are elbowed, wherein the depth T of the elbow corresponds approximately to the material thickness of the latching fingers 5, 6. During introduction of the article 2 the elbow 14 provides the latching finger 5, 6 with enough space to yield upon elastic deformation of the latching finger 5, 6. The elbow moreover offers a saving of space for the retaining clip 1. The ratio of the width BR of the individual latching fingers 5, 6 to the width BZ of the partition 4, 4' is approximately 2:5.

The outer walls 7, 7' have reinforcing structures 9, by means of which an extra stiffness of the outer walls 7, 7' is achieved. The effect of the extra stiffness is that, when a plurality of articles 2 are simultaneously introduced, the latching fingers 5, 6 are plastically deformed to a greater extent and so space is saved, and/or spreading is reduced.

When a plurality of articles 2 are simultaneously introduced into the retaining clip 1 according to the invention, widening of the retaining clip 1 is reduced as a result of the offset arrangement of the latching fingers 5, 6 because a portion of the widening is converted into a rotational motion of the partitions 4, 4'. A further portion of the widening is taken up by the latching fingers 5, 6, which as a result of the elbow have enough room to yield.

To increase the elasticity of the partition 4, 4', openings 13 are provided in the partition 4, 4'. The effect of the openings 13 is that the first latching fingers 5 are to a greater extent independent of the second latching fingers 6, thereby making it easier to introduce a plurality of articles 2. The distance A between the first latching finger 5 and the second latching finger 6 is preferably 10 to 15% of the width BZ of the partition 4, 4'. The outer walls 7, 7' also have a retaining function in that they each have one latching finger 5, 6.

The holding clip 1 according to the invention, for, in particular, simultaneous fastening of a plurality of approximately parallel-running, elongate articles to a structure (not shown), in particular for the fastening of lines, pipes or cables, having a base part 3, in which receivers 8 for the elongate articles 2 are formed, having at least one partition 4, 4' between two such receivers 8, which comprises a front side 12 and a rear side 11, wherein there are provided for securing the elongate articles 2 in the receivers 8 at least one first latching finger 5 at the front side 12 and at least one second latching finger 6 at the rear side 11 of the partition 4, 4', is characterised in that the width BR of each latching finger is smaller than the width BZ of the partition 4, 4' and the first latching finger 5 is arranged offset relative to the second latching finger 6 in such a way that no overlapping occurs. The laterally offset latching fingers 5, 6 allow a particularly compact style of construction of the retaining clip 1, which makes it possible to mount a plurality of articles in the retaining clip 1 simultaneously without the retaining clip 1 being substantially spread, with the result that the fastening of a plurality of articles is enabled in a simple manner.

The invention claimed is:

1. Retaining clip for simultaneous fastening of a plurality of approximately parallel-running, elongate articles to a structure, having a base part, wherein the base part having a top side, bottom side, end sides, front side and rear side, comprising receivers for retaining the elongate articles, having first and second extending upwardly and generally parallel partitions mounted on top side of the base part and between two receivers, wherein the receivers having U-shaped extending from front side and rear side of the base part; and at least one first latching finger coupled to the first partition at one side facing toward to one of the receivers adjacent the front side and at least one second latching finger coupled to the second partition at the other side facing toward to the other receiver adjacent rear side of the receiver;

wherein the width of the first and second latching fingers are smaller than the width of the first and second partitions and the first latching finger is arranged offset relative to the second latching finger in such a way that no overlapping occurs between the first latching finger and the second latching finger on the partitions, wherein an elbow is disposed between the first and second partitions, the elbow having a length about the length of the first and second partitions and defining an aperture therethrough, and wherein on both sides of each of the partitions are two or more vertically offset latching fingers disposed therein.

2. Retaining clip according to claim 1, characterized in that the first latching finger is arranged laterally offset relative to the second latching finger at a distance of 5 to 20% of the width of the partitions.

3. Retaining clip according to claim 1, characterized in that the first and second partitions has an opening in the form of a slot.

4. Retaining clip according to claim 1, characterized in that the ratio of the width of an individual latching finger to the width of the partition is between 1:4 and 1:2.

5. Retaining clip according to claim 1, characterized by outer walls, which for securing the elongate articles have at least one latching finger.

6. Retaining clip according to claim 1, characterized by outer walls, which are reinforced by reinforcing structures.

7. Retaining clip according to claim 1, characterized in that the retaining clip is made of elastic plastics material.

8. Retaining clip according to claim 1, characterized in that the first latching finger is arranged laterally offset relative to the second latching finger at a distance of 10 to 15% of the width of the partitions.

9. Retaining clip according to claim 1, characterized in that the ratio of the width of an individual latching finger to the width of the partitions is approximately 2:5.

10. Retaining clip for simultaneous fastening of a plurality of approximately parallel-running, elongate articles to a structure comprising: a base part having front side, rear side, end sides, top side and bottom side, comprising a plurality of u-shaped receivers extending between the front side and rear side of the base part for retaining the elongate articles, each receiver having at least one partition between two such receivers, each partition having a front and a rear surfaces and having at least one first pair of latching fingers at the front surface and at least one pair of second latching fingers at the rear surface of the partition;

wherein the width of each latching finger is smaller than the width of the partition and the first pair of latching fingers are arranged offset to the second pair of lactching fingers in such a way that no overlapping occurs between the first pair of latching fingers and the second pair of latching fingers on the partition, and wherein the first pair of latching fingers are arranged laterally offset relative to the second pair of latching fingers at a distance of 5 to 20% of the width of the partition and wherein both sides of the partition comprise two or more vertically offset latching fingers disposed respectively on each side, said partition further comprises a first offset portion and a second offset portion disposed on the top side of the base part and wherein the first offset portion is disposed adjacent front side of the base part and the second offset portion is disposed adjacent rear side of the base part, the first and second offset partitions being connected by an elbow along full sides of the first and second partitions.

11. A retaining clip according to claim 10, wherein the partitions have an opening therebetwwen in the form of a slot.

12. A retaining clip according to claim 10, wherein the ratio of the width of an individual latching finger to the width of the partition is between 1:4 and 1:2.

13. A retaining clip according to claim 10, comprising outer walls, having at least one latching finger.

\* \* \* \* \*

UNITED STATES PATENT AND TRADEMARK OFFICE
CERTIFICATE OF CORRECTION

| | | |
|---|---|---|
| PATENT NO. | : 7,533,852 B2 | Page 1 of 1 |
| APPLICATION NO. | : 10/814478 | |
| DATED | : May 19, 2009 | |
| INVENTOR(S) | : Mario Stigler | |

It is certified that error appears in the above-identified patent and that said Letters Patent is hereby corrected as shown below:

Column 5,
Line 54, "has" should be --have--.

Column 6,
Line 3, "partition" should be --partitions--.
Line 31, after "offset" insert --relative--.
Line 31, "lactching" should be --latching--.
Line 41, "on the top" should be --on top--.
Line 48, "therebetwwen" should be --therebetween--.

Signed and Sealed this

Fourth Day of August, 2009

JOHN DOLL
*Acting Director of the United States Patent and Trademark Office*